Nov. 10, 1942.  V. C. SCOTT  2,301,821
TRUCK TANK
Filed Sept. 7, 1940  4 Sheets-Sheet 1
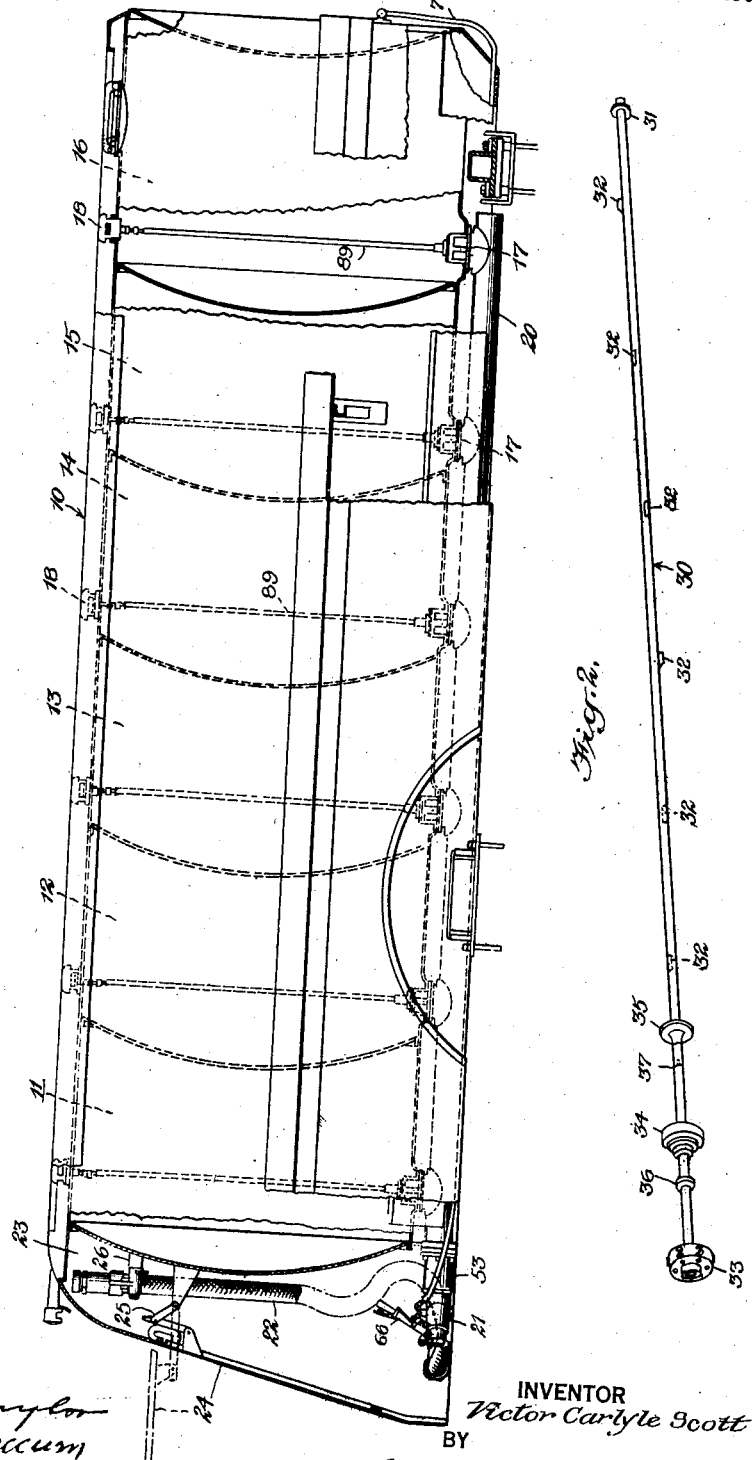
WITNESSES
INVENTOR
Victor Carlyle Scott
BY
ATTORNEYS Nov. 10, 1942.  V. C. SCOTT  2,301,821
TRUCK TANK
Filed Sept. 7, 1940  4 Sheets-Sheet 2
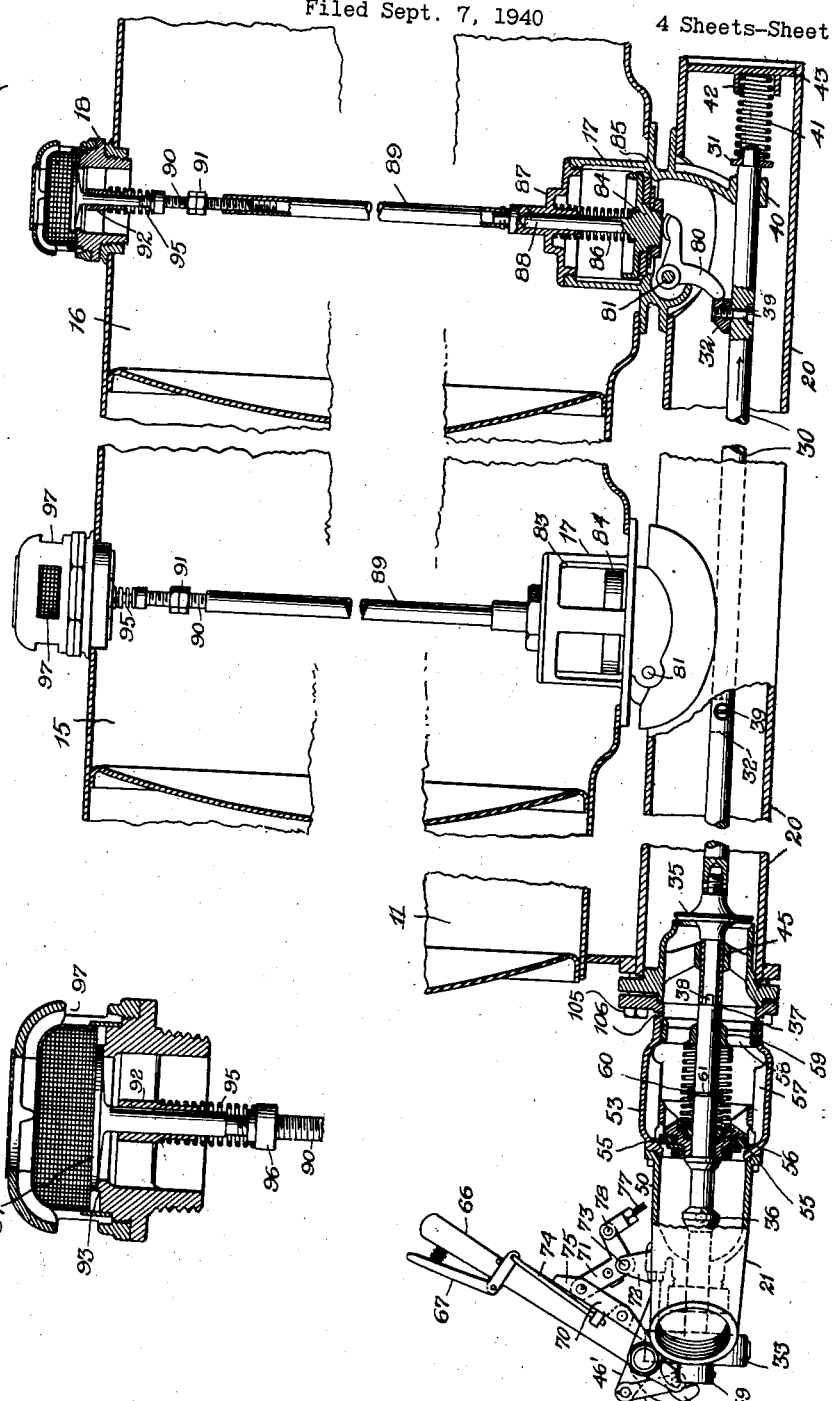
WITNESSES
INVENTOR
Victor Carlyle Scott
BY
ATTORNEYS Nov. 10, 1942.　　　V. C. SCOTT　　　2,301,821
TRUCK TANK
Filed Sept. 7, 1940　　　4 Sheets-Sheet 3

WITNESSES

INVENTOR
Victor Carlyle Scott
BY
ATTORNEYS

Nov. 10, 1942.	V. C. SCOTT	2,301,821
TRUCK TANK
Filed Sept. 7, 1940	4 Sheets-Sheet 4

WITNESSES

INVENTOR
Victor Carlyle Scott
BY
ATTORNEYS

Patented Nov. 10, 1942

2,301,821

UNITED STATES PATENT OFFICE 2,301,821

TRUCK TANK

Victor Carlyle Scott, Forest Hills, N. Y., assignor to City Tank Corporation, Corona, Long Island, N. Y., a corporation of New York Application September 7, 1940, Serial No. 355,716

9 Claims. (Cl. 137—21)

This invention relates to tanks, and more particularly to truck or mobile tanks adapted for the transportation of fluids such as oil and gasoline, or other fluids of a highly inflammable nature.

An object of the invention is to provide a valve control mechanism which will be simple in operation and by which the operator may selectively open any one of a number of individual tanks or compartments.

A further object is to provide a valve control mechanism by which it will be possible to operate a number of compartments within a tank, and which at the same time will be entirely covered and not subject to tampering or to the danger of fire.

Due to the highly inflammable nature of gasoline and other fluids which are normally transported in tanks of this type, stringent requirements are imposed by the various municipalities in order to safeguard against fire, explosion and other dangers. These requirements necessarily complicate the structure of truck tanks and in the past have caused manufacturers to build complicated and costly valve control mechanisms. As the number of compartments and size of the trucks increases, the requirements likewise increase and the number of safety appliances requires costly and cumbersome structure. It is the purpose of this invention, therefore, to reduce and simplify the mechanism required to properly operate the truck tanks and to enable the operator to selectively operate various individual tanks or compartments comprising the truck tank.

It is a further purpose to so construct this mechanism that all the various accessories, such as vent valves and fluid valves, may be controlled by one operation.

In the accompanying drawings—

Fig. 1 is a side view of a truck tank embodying my invention, with part of the side of the tank cut away;

Fig. 2 is a perspective view of a selective valve operating shaft;

Fig. 3 is a side view in detail, with portions cut away, of the mechanism shown in Fig. 1;

Fig. 4 is a detailed view of the vent valve;

Figure 5:
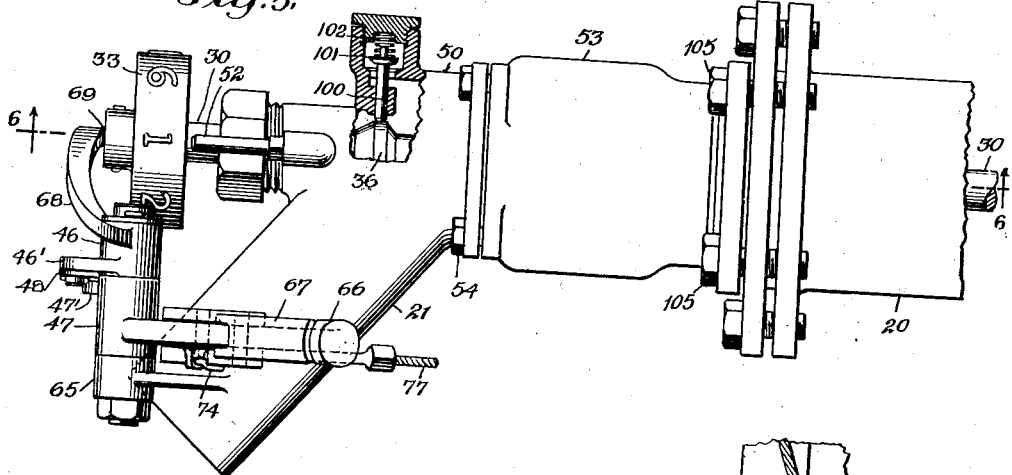
Fig. 5 is a top plan view of the nozzle used in my invention.
Figure 6:
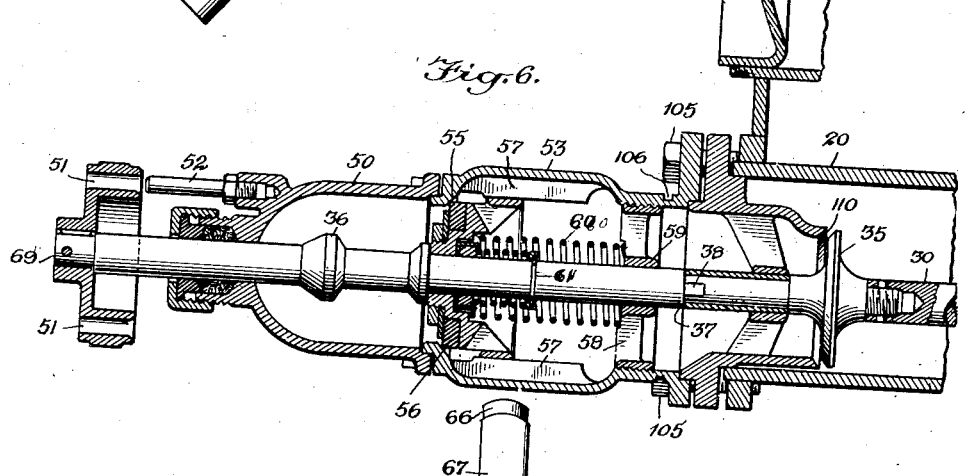
Fig. 6 is a cross sectional view, taken on the line 6—6 of Fig. 5.
Figure 7:
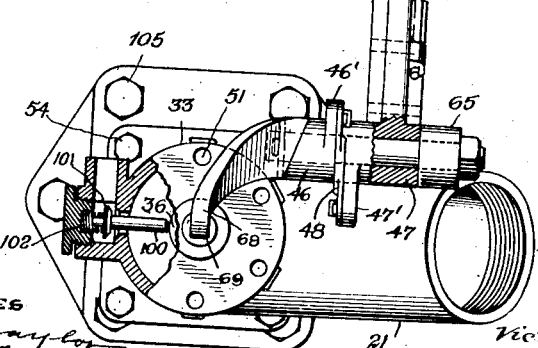
Fig. 7 is an end view of said nozzle.

While my invention is applicable to any type of tank, it is best suited to a multi-compartment type of tank 10 shown in Fig. 1. This type of tank consists of separate compartments 11, 12, 13, 14, 15 and 16, each of which must be separately operated and each of which is furnished with a tank valve 17 and a vent valve 18. Each of the tank valves 17 communicates with a common manifold or conduit 20 which leads to the nozzle 21, to which may be attached the conventional hose 22. A compartment 23 is provided at the rear of the tank truck in a conventional manner to house the hose and nozzle, and may be provided with a swinging door 24 and the conventional door mechanism 25 as well as the hose holding arm 26.

Extending through the conduit or manifold 20 is a valve operating shaft 30. The shaft 30 carries at one end a collar 31 and along its surface a series of lugs 32, each of which is offset angularly from the other. At the opposite end of the shaft 30 is a selecting wheel 33. The shaft 30 also carries a nozzle valve 34, an emergency valve 35, and an annular raised collar or nub 36, the purpose of which will become apparent as the description proceeds. The shaft 30 is in two pieces and is jointed between the valve 34 and the emergency valve 35 at 37, but is held against rotation by the key 38. The lugs 32 may be fastened to the shaft 30 by means of the screws 39 or in any convenient manner. One end of the shaft 30 rests in a bearing 40 and engages against the collar 31 abutting a spring 41 positioned in the collar 42 in the end 43 of the manifold 20. The spring 41 tends to push against the shaft 30 to force said shaft toward the nozzle. The shaft 30 likewise rests in the bearings 45 and 59 between the two valves 34 and 35.

As is most clearly shown in Fig. 5, the selecting wheel 33 mounted on one end of the shaft 30 extends beyond the faucet housing 50. The selecting wheel 33 is provided with numerals each of which registers with one of the radial offset lugs 32 on the shaft 30. Under each numeral is a registering hole 51 adapted to register with the pin 52 set in the housing. The nozzle housing 50 engages a nozzle valve housing 53 and may be fastened by means of bolts 54 or otherwise. The valve housing 53 comprises a valve seat 55 and the chamber 56. The valve 34 is guided by the spokes 57 and spokes 58 carry bearing 59 and guide the shaft 30. A spring 60 operating against the bearing 59 and against the ring 61 on the shaft 30 tends to press the valve 34 against the seat 55 to keep it in a closed position.

Figure 8:
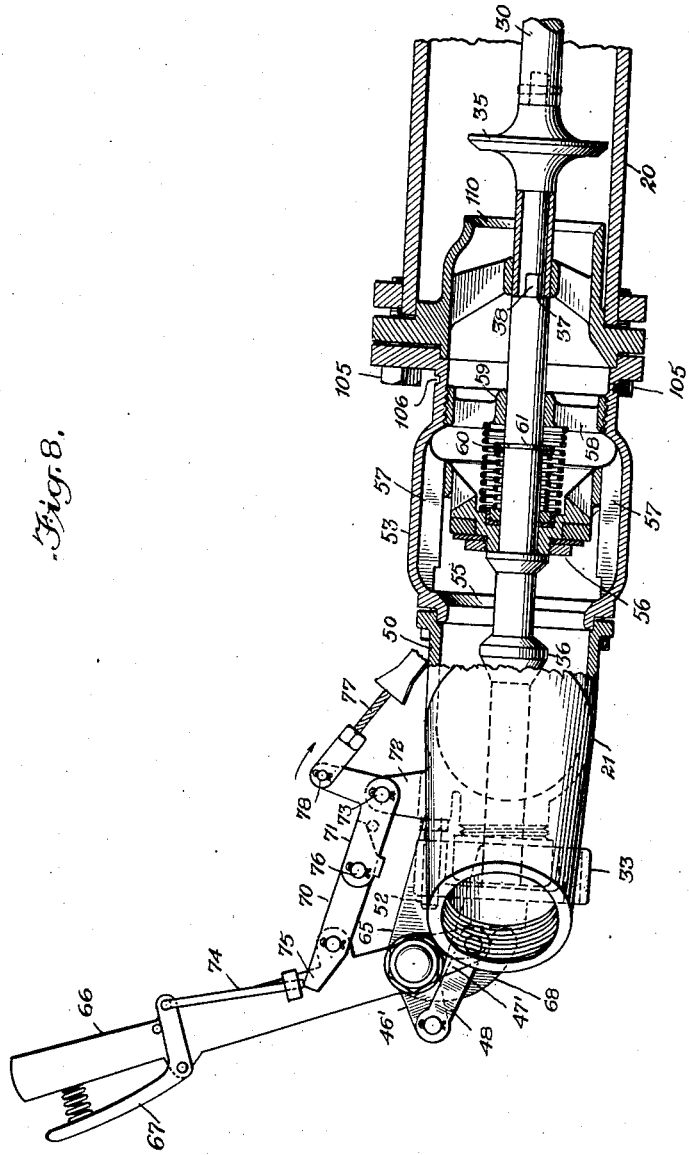
Fig. 8 is a side view of the nozzle, partly in cross section, showing the nozzle valve in an open position.

Mounted on the nozzle 21 is the operating handle mechanism 65 including the handle 66, the release lever 67 and the arm 68. The arm 68 engages the end 69 of the shaft 30, so that when the handle 66 is pulled rearwardly the arm 68 forces the shaft 30 against the springs 41 and 60 and moves the valve 34 rearwardly from its seat, thus allowing the passage of fluid therethrough. Links 70 and 71 on being brought into line, as shown in Fig. 8, hold the handle in the rearward position. The link 71 may be an elbow link pivoted to the arm 72 on the nozzle 21 at 73. It will be seen that upon operating the release lever 67 the rod 74 will exert pressure upon the end 75 of the link 70 causing the links to buckle at their pivot 76 to allow the operating handle 66 to move forwardly. A cable 77 also engages the link 71 at 78. The cable 77 extends to the opposite end of the tank so that it may be pulled in an emergency to release the operating handle. The links 70 and 71 may be fusible in their nature so that in the event of fire they will immediately melt to allow the shaft 30 to move against the operating handle in order to close the valves.

The sleeve 46 carrying the arm 68 and the sleeve 47 carrying the handle 66 are connected by means of a fusible link 48 which engages the extension 46' of the sleeve 46 and the extension 47' of the sleeve 47. This fusible link will in the event of fire, allow the sleeves 46 and 47 to move independently of each other and upon melting will allow the springs 41 and 60 to force the shaft 30 toward the nozzle 21 to close the valves.

As previously pointed out, the selecting wheel 33 bears numbers which register with the lugs 32 upon the shaft 30. The numbers designate the various compartments making up the truck tank, and the operator may select the compartment he desires by turning the selecting wheel 33 so that the number of the compartment registers with the pin 52. This will cause the lug 32 to register with a rock arm 80 pivoted at 81 below the tank valve 17 of the desired compartment. It will be appreciated that each compartment has a similar valve 17 and a similar rock arm 80. When one compartment is selected, the lugs 32 being radially offset will not engage their respective rock arms 80 on the other compartments.

The valve 17 is provided with open ports 83 and with a valve member 84 operating against a valve seat 85. A spiral spring 86 operating against the top of the housing 87 at the top of the valve 84 tends to keep the valve in its seat and closed. A rod 88 connecting with the valve 84 extends through the housing and engages the tube 89 extending upwardly through the tank. The tube 89 in turn engages a rod 90 and this engagement may be adjusted by the nut 91. The rod 90 extends through the housing 92 of the vent valve 18, and mounted above said housing on the valve seat 93 is a valve 94. A spring 95 engages the housing 92 and presses against a nut 96 on the rod 90 to keep the valve 94 normally seated and closed. Screen vents 97 allow the passage of air when the vent valve is open.

It will be seen that when the operating handle 66 is pulled back, the shaft 30 is forced toward the end 43 of the conduit or manifold 20 forcing the lug 32 against the rock arm 80 causing the valve 84 to leave its seat 85 and at the same time forcing the vent valve 18 to open, thus allowing fluid to flow from the compartment into the manifold through the valve 34 and out of the nozzle 21.

The raised nub 36 on the shaft 30 normally engages a pin 100 when the nozzle valves and tank valves are closed, thus opening the vent valve 101 which allows the hose to drain. When the shaft 30 is forced rearwardly to open the nozzle valve 34 and a tank valve 17, the spring 102 closes the valve as the pin 100 slides off the nub 36. This is a safety measure which permits the hose and nozzle to drain after the valves are closed.

The valve housing 53 engages the rear of the manifold 20 and is fastened by bolts 105. The housing 53 is weakened at 106 so that in the event of collision, or in the event of unusual stress being placed upon the nozzle 21 or valve housings 53, the valve housing will break at 106. As has been previously pointed out, the shaft 30 is in two portions, joined at 37, and controlled by the key 38. In the event of the housing breaking at 106, the shaft will part at 37. The valve 35 is normally slightly removed from its seat 110, and when the shaft 30 is forced inwardly against the spring 41, the valve 35 is moved further from the seat. However, in the event that the valve housing breaks at 106, the shaft will part at 37, thus allowing the valve 35 to move immediately into its seat 110 closing the manifold 20 to prevent the flow of any fluid therefrom whether or not the valves 17 are open.

It will be appreciated that the operator may select whichever compartment (11, 12, 13, 14, 15, 16, etc.) he may desire to draw from by rotating the selecting handle 33. As has been previously pointed out, the shaft 30 is free to rotate, and the rotation of the handle 33 will bring one of the lugs 32 into contact with the rock arm 80 on the selected compartment leaving all other lugs free from the rock arms on the other compartments, then by simply pulling back the handle 66, the vent, tank and nozzle valves will be opened to allow the fluid to flow from the selected compartment into the hose. While I have shown the hose and nozzle situated at the rear of the tank and at the end of the manifold or conduit 20, it will be readily appreciated that the nozzle may be placed at any part of the manifold and that many other changes, such as the increase or decrease in the number of compartments, may be made without departing from the spirit of the invention.

I claim:

1. In a tank having a plurality of compartments, a manifold, valves in said manifold, a valve in each of said compartments communicating with said manifold, a vent valve in each of said compartments, and a single means operating within said manifold for simultaneously opening one of said compartment valves, the corresponding vent valve, and said manifold valves.

2. A tank having a plurality of compartments, a manifold, a valve connecting each of said compartments with said manifold, a vent valve in each of said compartments, resilient means for maintaining said vent valve and said compartment valves in closed position, and means within said manifold for opening a selected one of said compartment valves and simultaneously opening the corresponding vent valve.

3. In a tank having a plurality of compartments and a single nozzle, a single manifold connecting all of said compartments with said nozzle, valves between each of said compartments and said manifold, a shaft in said manifold and a manifold valve on said shaft adjacent said nozzle, means on said shaft to selectively open each of said compartment valves, and means for exerting pressure on said shaft to open a selected one of said compartment valves and said manifold valve.

4. A tank having a plurality of compartments, a compartment valve in each of said compartments connecting said compartments to a common manifold in each of said compartments, means on each of said compartment valves for opening said compartment valves and the corresponding vent valve, a shaft in said manifold, and means on said shaft for operating one of said valve opening means.

5. In a tank having a plurality of compartments, a manifold extending under said compartments, a valve member on the outer end of said manifold, a valve member in each of said compartments communicating with said manifold, vent valves oppositely disposed to said compartment valves, rigid means extending between said compartment valves and vent valves adapted to open said vent valves when said compartment valves are open, spring means for normally maintaining said vent and compartment valves in closed position, means for opening each of said compartment valves, a shaft extending through said manifold, projections on said shaft adjacent each valve-opening means, said projections being each angularly offset from the others, means on said shaft to rotate said shaft and to register said shaft so that one of said projections will engage one of said valve-opening means, means on said shaft engaging the manifold valve, and means for engaging the end of said shaft to move said shaft longitudinally to open the manifold valve and one of said compartment and vent valves.

6. In a tank having a plurality of compartments, a manifold communicating with the bottom of each of said compartments, valves between said compartments and said manifold, a shaft in said manifold and extending therethrough, a valve at one end of said manifold on said shaft and rotatable thereon, a series of angularly offset projections one of said projections being adjacent each of said compartment valves, valve-opening means for each of said compartment valves adapted to engage said projections, means for rotating said shaft to engage one of said projections with the valve-opening means of one of said compartment valves, a faucet member at the end of said manifold, and a handle on said faucet member, said handle including means to engage the end of said shaft to open said manifold valve and one of said compartment valves.

7. A valve-operating mechanism including a manifold, a plurality of valves leading into said manifold, a valve at one end of said manifold, spring means normally closing all of said valves, a shaft extending through said manifold and through said manifold valve, a projection on said shaft engaging said manifold valve, angularly offset projections on said shaft one for each of said valves leading into said manifold, valve opening means on each of said valves adapted to engage the corresponding projection when said shaft is in a predetermined position, means for rotating said shaft to bring one of said angularly offset projections into engagement with the corresponding valve-opening means, and means for moving said shaft laterally to open said manifold valve and the selected valve leading into said manifold.

8. In a storage tank, a valve at the bottom of said tank leading to a manifold, an elbow pivoted below said valve within said manifold and adapted to exert pressure against said valve to unseat it, a vent valve at the top of said tank, an adjustable rod connecting both valves, and operating means within said manifold whereby pressure may be brought against said elbow to unseat said compartment valve and said vent valve.

9. A valve operating mechanism including a plurality of valves leading to a common manifold, spring means normally closing said valves, a shaft mounted in said manifold bearing angularly offset projections, one for each valve, means for rotating said shaft to bring one of said projections into operating position, and additional means on each valve to engage the corresponding projection on said shaft when said shaft is in a predetermined position to open said valve when said shaft is moved longitudinally.

VICTOR CARLYLE SCOTT.